Sept. 29, 1953  H. E. TEBBETTS, JR., ET AL  2,653,818
FABRIC REINFORCED FOOTBALL
Filed Jan. 22, 1949
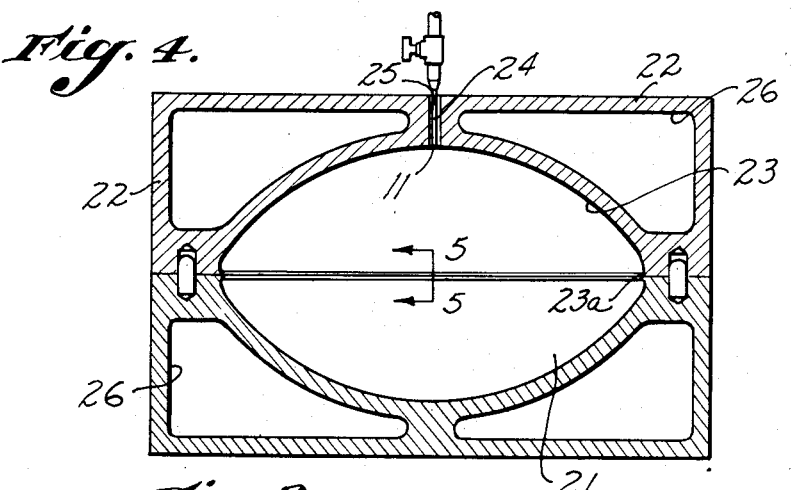
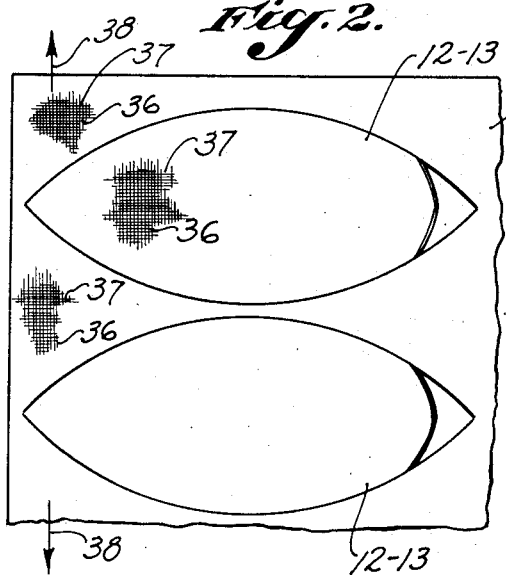
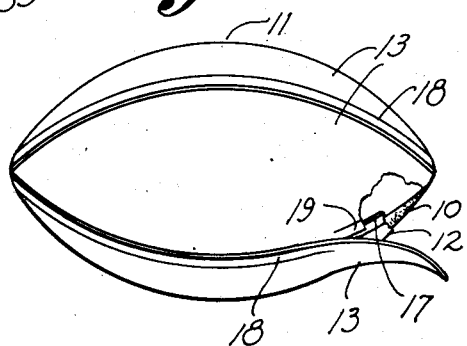
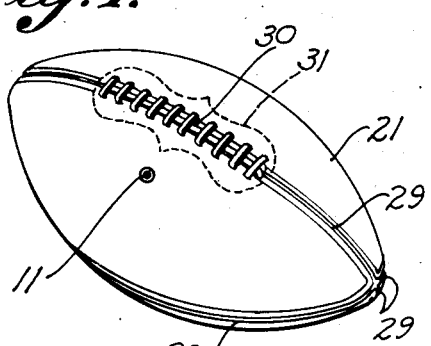
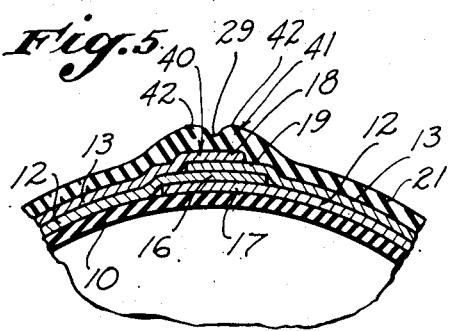
INVENTORS:
HERBERT EDWIN TEBBETTS JR.
ANTONE F. REZNICEK
BY THEIR ATTORNEYS
HARRIS, KIECH, FOSTER & HARRIS
BY Patented Sept. 29, 1953

2,653,818

UNITED STATES PATENT OFFICE 2,653,818

FABRIC REINFORCED FOOTBALL

Herbert Edwin Tebbetts, Jr., Whittier, and Antone F. Reznicek, Altadena, Calif., assignors to W. J. Voit Rubber Corporation, Los Angeles, Calif., a corporation of California Application January 22, 1949, Serial No. 72,166

9 Claims. (Cl. 273—65)

Our invention relates in general to molded articles and their manufacture and, more particularly, to athletic balls of molded material, the term "molded materials" or "moldable materials" as used herein being intended to include not only natural rubbers but any synthetic materials, such as the so-called "synthetic rubbers," "thermoplastics," and "thermosetting resins."

The invention is of particular utility when applied to nonspherical athletic balls such as footballs, and will be considered in connection with footballs and their manufacture herein for purposes of illustration. As a matter of convenience, a football will hereinafter be regarded as "generally ellipsoidal" in shape. Also, the adjective "lenticular" will be employed hereinafter as descriptive of the shape of a double-convex section of the football wall which extends substantially from one end of the football to the other.

In general, a molded football of the type to which the present invention is particularly susceptible of application is provided with a flexible wall which may include a generally ellipsoidal bladder of moldable material, at least one layer of reinforcing material around the external surface of the bladder, and a suitable cover, preferably formed of moldable material, preferably bonded to the external surface of the reinforcing layer. A valve for inflating the football is customarily secured to the bladder and extends through the reinforcing layer and the cover. In a football of this type, the reinforcing layer or "carcass," as it is often called, is frequently formed of a plurality of substantially lenticular pieces of fabric which are applied to the bladder with their major axes extending lengthwise of the bladder and with their minor axes extending circumferentially thereof. The dimensions of the pieces in the directions of their minor axes are preferably such that an edge of each piece overlaps an edge of an adjacent piece. In order to secure adequate reinforcement, it is customary to employ one or more fabric reinforcing layers between the bladder and the cover, each such reinforcing layer comprising a plurality of preferably overlapping, lenticular pieces of fabric. It is possible, however, to make such a football with the reinforcing layer or layers made of pieces of a shape other than lenticular, and we do not desire to be limited with regard to the shape of the pieces.

A difficulty which is frequently experienced with conventional footballs of the foregoing character is that they tend to enlarge circumferentially, i. e., in the direction of their minor circumference, because of the fact that inflated ellipsoidal objects tend to assume more nearly spherical shapes unless restrained. We have found that in conventional molded footballs of the type under consideration, the fabric reinforcing layers do not provide sufficient restraint to prevent such circumferential enlargement upon inflation and in use, the pieces of fabric comprising the reinforcing layer being inherently stretchable in such conventional footballs and permitting circumferential enlargement thereof. Obviously, such a situation is extremely undesirable since excessive circumferential enlargement renders the football unfit for use because of its deleterious effect on the playing and rebound characteristics of the ball.

More specifically, an object of our invention is to minimize such circumferential enlargement by prestretching the pieces of fabric of the reinforcing layers in directions substantially parallel to the minor axis of the football to such an extent that they are substantially incapable of further stretching in such directions at air pressures to which footballs are customarily inflated during normal use. A further object in this connection is to provide a football wherein the pieces of fabric have warp and woof threads extending substantially parallel to their respective axes so that the fabric pieces, by being prestretched in directions substantially parallel to their minor axes, are prestretched in directions substantially parallel to either the warp or woof threads, whichever are parallel to the minor axis of the football. Lenticular pieces of fabric for the reinforcing layers, if such are used, are preferably cut with their minor axes extending substantially parallel to the warp threads so that the warp threads are the ones which are prestretched, although the lenticular pieces may be cut with their minor axes substantially parallel to the woof threads so that the latter are the ones which are prestretched.

An important object is to provide a football wherein the pieces of fabric are prestretched in directions substantially parallel to the minor axis of the football to an extent such that they are incapable of stretching more than 10 per cent of their dimensions in such directions at the normal inflation pressure employed. Preferably, the fabric pieces are prestretched to such an extent that they are incapable of stretching more than 5 per cent of their dimensions in directions parallel to their minor axes at a tension of 10 pounds or less per inch of width.

When reinforcing layers composed of pieces of fabric prestretched in the foregoing manner are employed, circumferential enlargement of the football, i. e., enlargement of the football in the direction of its minor circumference, is minimized, which is an important feature of the invention.

Another important object of our invention is to provide a football which is of noncircular cross section in a plane normal to its major axis, and which is preferably of a cross section in such plane which is intermediate a circular cross section and a square cross section. In conventional molded footballs using lenticular-shaped pieces of fabric in the reinforcing layer, it is usual practice to cut the fabric so that the warp and woof threads thereof are at angles with relation to the major and minor axes of the pieces. In other words, such lenticular pieces are conventionally cut on a diagonal relative to the warp and woof threads. This conventional practice facilitates formation of the reinforcing layer but provides a weak construction, due to the diagonal direction of the threads, which permits circumferential growth of the football in use, which is undesirable. Where the threads of the fabric of the reinforcing layer are disposed parallel to the axes of the football in accordance with the present invention, and even without the prestretching referred to above, the tendency to circumferential growth is very substantially curtailed, and this, alone, is an important object of the invention. Even without such prestretching, our invention provides a football which will tend to retain its semi-square cross section much better than conventional footballs. While lenticular-shaped pieces of fabric are desirable to provide the desired "squareness" in such a football, it is to be understood that even if the fabric for the reinforcing layer is not of lenticular form, by disposing the threads parallel to the axes of the football, undesirable circumferential growth can be minimized.

An important feature of the invention is that prestretching the pieces of fabric of the reinforcing layers in the foregoing manner, i. e., prestretching the fabric pieces in the direction of the minor circumference of the football, preserves the foregoing noncircular cross-sectional configuration by minimizing enlargement of the football in the direction of its minor circumference. Thus, once the desired noncircular cross section is established, it is maintained by prestretching the pieces of fabric of the reinforcing layer in the manner indicated.

Considering the manner in which the desired noncircular cross-sectional configuration is established when such lenticular pieces are employed, we prefer to overlap an edge of each lenticular piece of fabric of each reinforcing layer with an edge of an adjacent lenticular piece of the same layer, and, where several of such layers are employed, superimpose, or bring into registry or alignment, the overlapping edges of the various reinforcing layers to form ridges on the external surface of the outer reinforcing layer, which ridges extend lengthwise of the football from end to end thereof. We prefer to employ four lenticular pieces of fabric for each reinforcing layer so as to provide four ridges on the outer surface of the outer reinforcing layer, the four ridges corresponding to the four seams customarily provided in conventional leather-covered footballs.

We prefer to employ a molded cover for the football and, in applying the cover to the external surface of the outer reinforcing layer, we provide grooves extending lengthwise of the football and superimposed on the ridges formed on the external surface of the outer reinforcing layer, such grooves simulating the seams customarily provided in conventional leather-covered footballs. An important object of our invention in this connection is to make the total wall thickness greater in the areas of the aforementioned ridges than in the areas intermediate the ridges to enhance the noncircularity, or squareness, of the cross section of the football in a plane normal to its major axis.

The foregoing objects and advantages of the present invention, together with various other objects and advantages thereof which will become apparent, may be obtained through the utilization of the exemplary embodiment of the invention which is illustrated in the accompanying drawing and which is described in detail hereinafter. Referring to the drawing:

Fig. 1 is a perspective view of a molded football of the invention and manufactured in accordance with the method of the invention;

Fig. 2 is a plan view illustrating a piece of fabric used in the manufacture of our football and illustrating two steps of the method of the invention;

Fig. 3 is a perspective view of a partially completed football manufactured in accordance with the method of the invention;

Fig. 4 is a sectional view showing a partially completed football in a mold as a further step of the method of the invention;

Fig. 5 is an enlarged, and somewhat exaggerated, fragmentary sectional view through the wall of a completed football manufactured in accordance with the method of the invention, Fig. 5 being taken along the broken line 5—5 of Fig. 4

As a matter of convenience, before considering the method of our invention and its product in detail, we will consider the method and product first in a general way. Also, our method will be considered as applied to a football having two fabric plies or reinforcing layers, although it will be understood that the invention may be extended to one or any number of plies as desired.

In general, our method involves the employment of a generally ellipsoidal bladder 10 having an inflating valve 11 of any suitable type secured thereto, the bladder being formed of a moldable material as is well known in the art. In the particular illustrative embodiment under consideration, we inflate the bladder 10 to a relatively low pressure, and apply to the partially inflated bladder two layers of reinforcing material, viz., fabric. As best shown in Figs. 3 and 5 of the drawing, the inner layer comprises a plurality of lenticular pieces 12 of fabric and the outer layer comprises a plurality of lenticular pieces 13 of fabric. Preferably, each of the reinforcing layers is composed of four such lenticular pieces in correspondence with the four panels with which the cover of a football is conventionally provided, although this number may be varied as desired without departing from the spirit of the invention. The lenticular pieces 12 and 13 comprising the respective inner and outer reinforcing layers extend lengthwise of the bladder 10 and are of sufficient lengths in the directions of their major axes to extend substantially from one end of the bladder to the other. The lenticular pieces, if desired, may terminate short of the ends of the bladder and the ends of the bladder may be covered with conventional polar reinforcing caps (not shown) which overlap the ends of the lenticular pieces.

As best shown in Figs. 3 and 5 of the drawing, the dimensions of the lenticular pieces 12 and 13 in the directions of their minor axes are preferably somewhat greater than one quarter of the minor circumference of the bladder 10 so that the edges of the pieces overlap somewhat. Referring particularly to Fig. 5, one edge 16 of each lenticular piece 12 overlaps an edge 17 of adjacent lenticular piece 12, and one edge 18 of each lenticular piece 13 overlaps an edge 19 of an adjacent lenticular piece 13. The specific overlapping arrangement of the invention will be discussed in more detail hereinafter. It is to be understood, however, that if desired the pieces 12 and 13 need not overlap, but the edges thereof may be abutted with an overlying strip overlying the joint, as is well known in the art.

In order to permit bonding of the lenticular pieces 12 to each other and to the lenticular pieces 13, the fabric of the lenticular pieces 12 and 13 may be impregnated with a moldable material, as by a calendering operation, for example. Alternatively, or in addition, the bladder 10 may be dipped in or sprayed with a liquid form of rubber material or other suitable bonding agent, such as rubber cement, for bonding of the lenticular pieces 12 to the bladder. Rubber cement may also be disposed between the overlapping edges 16 and 17 of the pieces 12, between the pieces 13 and the pieces 12, and between the overlapping edges 18 and 19 of the pieces 13 to promote better bonding during the subsequent bonding operation which will be described hereinafter. The bladder 10 may be bonded to the reinforcing layer 12 or not, as desired.

A cover 21, preferably of a moldable material, is applied over the lenticular pieces 13, additional rubber cement or other bonding agent being interposed between the pieces 13 and the cover if desired. It will be understood that although we prefer to employ a cover 21 of moldable material, the invention is not necessarily limited thereto since covers of leather or other suitable abrasion-resistant material may be employed as is well known in the art.

After the lenticular pieces 12 and 13 and the cover 21 have been applied to the partially inflated bladder 10, the latter is placed in a mold having a mold cavity 23 conforming in size and shape to the desired size and shape of the completed football. Subsequently, the bladder 10 is preferably further inflated, as by means of a needle 24 inserted through an opening 25 in the mold 22 and through the valve 11, to a substantial pressure so as to urge the bladder 10, the lenticular pieces 12 and 13 and the cover 21 into intimate engagement to promote better bonding. Heat is then applied to the ball, as by circulating a hot fluid at a suitable temperature through passages 26 in the mold 22, so as to vulcanize the rubber-like constituents thereof and bond the bladder 10, the lenticular reinforcing pieces 12 and 13 and the cover 21 together. The wall of the mold cavity 23 is provided with ridges 23a which form grooves 29 in the external surface of the cover 21, such grooves extending lengthwise of the football and from one end thereof to the other. The grooves 29 simulate the seams in the covers of conventional leather-covered footballs and are preferably four in number to correspond to the number of seams customarily provided in such conventional leather-covered footballs. Also, the wall of the mold cavity 23 is preferably formed in a manner not specifically shown but well known in the art to mold an imitation lacing 30 and imitation stitching 31 in the cover 21 of the football.

Although the partially completed ball may be placed in the mold for the bonding operation after application of the cover 21, one or more intermediate bonding operations may be performed prior to application of the cover if desired, and it will be understood that the present invention is not to be limited to a single molding operation during fabrication of the football.

The description thus far has primarily been concerned with a general method which is not limited to being practiced in accordance with the present invention and which, per se, forms no part of the present invention. Thus, the reinforcing layers may be formed over a wax or other solid form which can be removed after fabrication. The novel features of our method will now be considered in detail.

As an initial step in the method of the present invention, we prestretch the fabric pieces 12 and 13 in directions substantially parallel to their minor axes to such an extent that they are substantially incapable of being stretched further in such directions at normal inflation pressures which provide a tension of 10 pounds or less per inch of width. In practice, we have found that the fabric pieces 12 and 13 should be prestretched before application to the bladder 10 to at least such an extent that they are incapable of stretching more than 10 per cent in directions substantially parallel to their minor axes without rupture. Preferably, the pieces 12 and 13 are prestretched to such an extent that they will not stretch more than 5 percent of their dimensions in directions substantially parallel to their minor axes without rupture when subjected to stretching forces in such directions.

As will be discussed in more detail in the following paragraph, the fabric pieces 12 and 13 are provided with warp and woof threads extending substantially parallel to their respective axes so that the fabric pieces are prestretched, during the aforementioned prestretching operation, in directions parallel to either the warp or woof threads. As a matter of convenience in manufacture, the warp threads preferably extend substantially parallel to the minor axes of the fabric pieces 12 and 13, and are the ones which are prestretched, for a reason which will become apparent.

The warp threads, of course, may be prestretched before the fabric is woven, if so desired.

Referring particularly to Fig. 2 of the drawing, our method involves prestretching a piece of fabric 35, having warp and woof threads 36 and 37, in directions parallel to either the warp threads or the woof threads. In practice, the piece of fabric 35 is taken from a bolt of fabric (not shown) in which the warp threads 36 extend lengthwise of the fabric in the bolt so that, as a matter of convenience in manufacture, we prefer to prestretch the piece of fabric in directions parallel to the warp threads 36 thereof by applying tensioning forces thereto in directions parallel to the warp threads, as indicated by the arrows 38. It wil be understood, of course, that the piece of fabric 35 may be prestretched in directions parallel to the woof threads 37, if desired, without departing from the spirit of the invention.

The piece of fabric 35 may be stretched in the direction of the arrows 38 in any suitabe manner and, as hereinbefore indicated, is prestretched to such an extent that, after prestretching, it is capable of being stretched not more than an additional 10 per cent, and preferably not more than an additional 5 per cent, of its prestretched length in the direction of the warp threads 36 before breaking of the warp threads will occur. However, as inflation pressure for normal use is usually so low as to provide a stress of 10 pounds or less per inch of width of the fabric, there is no substantial stretch during normal play of the football, and this is the important factor.

After the piece of fabric 35 has been prestretched in the direction of the warp threads 36 to the extent indicated, the pieces 12 and 13 are cut therefrom with the minor axes of the pieces 12 and 13 extending in directions parallel to the prestretched warp threads 36, all as shown in Fig. 2 of the drawing. The resulting pieces 12 and 13 cut from the prestretched piece of fabric 35 are thus prestretched to the desired extent in directions substantially parallel to their minor axes.

The pieces 12 and 13 are then incorporated in the football in the manner hereinbefore discussed. As will be apparent, when the pieces 12 and 13 which have been prestretched in the directions of their minor axes are incorporated in the football, the prestretched warp threads 36 of the original piece of fabric 35 extend circumferentially of the football, i. e., extend parallel to the minor circumference of the football. The prestretched warp threads 36 thus minimize circumferential enlargement of the football upon inflation thereof to playing pressures and in use so as to preserve the desired playing characteristics. We have found that when fabric pieces 12 and 13 are prestretched in the foregoing manner and incorporated in the football and held in the prestretched condition by the impregnating material, the minor circumference of the football will not increase more than two per cent when the ball is inflated to normal playing pressures when the fabric pieces 12 and 13 have been prestretched to such an extent that they are incapable of stretching more than ten per cent in the directions of their minor axes without rupture. Similarly, if the fabric pieces 12 and 13 are prestretched in the directions of their minor axes to an extent such that they are incapable of stretching further by more than 5 per cent without rupture, we have found that the resulting football will not enlarge circumferentially by more than one per cent at normal inflation pressures. As a result, the football will retain the desired size and shape during use so that the desired playing characteristics will be preserved, which is an important feature of our invention.

While we have described in the preferred embodiment the use of lenticular-shaped pieces of fabric for the reinforcing layer, which is very desirable to provide the desired semi-square cross-sectional shape of the football, it is to be distinctly understood that fabric pieces of other shapes may advantageously be used so as to incorporate the two features of: (a) disposing the threads parallel to the axes of the football; and (b) prestretching the threads that are to be disposed parallel to the minor axis of the football.

It should be pointed out that when the piece of fabric 35 is prestretched in the foregoing manner in the direction of the warp threads 36, some slackening of the woof threads 37 may occur due to the fact that the width of the piece of fabric tends to decrease as it is so prestretched. Consequently, the woof threads 37 may be rendered more stretchable by the prestretching of the warp threads so that the pieces 12 and 13 cut from the piece 35 may be capable of considerable stretching in the directions of their major axes. However, this has no adverse effect on the resulting football because of the fact that, as hereinbefore discussed, an inflated ellipsoidal body such as a football tends to assume a spherical shape. Thus, the fact that the pieces 12 and 13 are capable of appreciable stretching in the directions of their major axes produces no substantial elongation of the football. Thus, our method provides a football which will better retain its size and shape in all directions by prestretching the fabric threads which extend parallel to its minor circumference.

As hereinbefore indicated, one of the features of the present invention is that it provides a football having a noncircular cross section in a plane normal to its major axis. As best shown in Fig. 5 of the drawing, this is accomplished by superimposing the overlapping edges 18 and 19 of the fabric pieces 13 on the overlapping edges 16 and 17 of the pieces 12. The result of so superimposing the overlapping edges 16 to 19 is that ridges 40 are formed on the external surface of the outer reinforcing layer, which ridges produce a transverse cross-sectional configuration which is noncircular and which is intermediate a circle and a square. A similar result may be attained by abutting the edges 16 and 17 and 18 and 19 and providing suitable stripping covering the joints and between and on top of the pieces 12 and 13, respectively. It is to be understood, of course, that only a single layer of fabric may be used for the reinforcing layer if desired. Such a cross-sectional configuration more nearly simulates the cross-sectional configuration of a conventional leather-covered football, and is more acceptable to skilled players, which is an important feature of the invention.

In order to further enhance the noncircularity of the transverse cross section of the football, we prefer to make those parts of the cover 21 which overlie the ridges 40 of thicker material than the parts intermediate the ridges, as shown in Fig. 5 of the drawing. The seam-simulating grooves 29 in the external surface of the cover are formed in the thicker parts 41 of the cover and overlie the ridges 40. It will be noted that each of the grooves 29 lies between relatively thick ribs 42 which may be gripped conveniently by a player using the football.

It will be apparent that prestretching the fabric pieces 12 and 13 in directions substantially parallel to their minor axes, in addition to minimizing enlargement of the football along its minor circumference, aids in maintaining the noncircular cross-sectional configuration provided by the overlapping edges 16 to 19 and the thicker parts 41 of the cover 21. If it were not for the fact that prestretching the fabric pieces 12 and 13 in the manner indicated and the orientation of the threads render the ball substantially non-stretchable along its minor circumference, the ball would assume more closely a circular cross-sectional configuration despite the presence of the overlapping edges 16 to 19 and the thicker parts 41 of the cover.

As shown in Fig. 5 of the drawing, the extreme edges of the lenticular pieces 12 and 13 are preferably staggered or misaligned with respect to each other. We have found that if the extreme edges of the pieces 12 and 13 were not so misaligned, the effect of a hinge at either side of the ridges 40 might be produced, which is undesirable.

Although we have disclosed exemplary embodiments of our method and its product herein for purposes of illustration, it will be understood that various modifications and substitutions may be incorporated therein without necessarily departing from the spirit of the invention as set forth in the appended claims.

We claim as our invention:

1. As an article of manufacture, a reinforcing wall for an inflatable football having a layer of fabric providing warp and woof threads disposed so as to extend parallel to the major and minor axes of the football, the threads disposed to extend parallel to said minor axis, and only these threads, being prestretched before being incorporated in said wall.

2. As an article of manufacture, a reinforcing wall for an inflatable football having a layer of fabric composed of a plurality of lenticular pieces of said fabric joined together adjacent their edges, each of such pieces providing warp and woof threads disposed so as to extend parallel to the major and minor axes of the football, the threads disposed to extend parallel to said minor axis, and only these threads, being prestretched before being incorporated in said wall.

3. As an article of manufacture, a reinforcing wall for an inflatable football having an inner layer of fabric composed of a plurality of lenticular pieces joined together adjacent their edges, and an outer layer of fabric composed of a plurality of lenticular pieces joined together adjacent their edges, said layers being bonded together, the joints of said outer layer substantially overlying the joints of said inner layer so as to form longitudinal ridges along said wall, each of said pieces providing warp and woof threads disposed so as to extend parallel to the major and minor axes of the football, the threads disposed parallel to said minor axis and only these threads, being prestretched before being incorporated in said wall.

4. In a reinforcing wall for an inflatable football, the combination of: an inner layer composed of a plurality of joined pieces of fabric; an outer layer composed of a plurality of joined pieces of fabric overlying and bonded to said inner layer, the joints of said outer layer substantially overlying the joints of said inner layer so as to form longitudinal ridges along said wall, each of said layers providing warp and woof threads disposed so as to extend parallel to the major and minor axes of the football, the threads disposed to extend parallel to said minor axis, and only these threads, being prestretched before being incorporated in said wall.

5. In a reinforcing wall for an inflatable football, the combination of: an inner layer of fabric; an outer layer of fabric overlying and bonded to said inner layer, each of said layers providing warp and woof threads disposed so as to extend parallel to the major and minor axes of the football, the threads disposed parallel to said minor axis, and only these threads, being prestretched before being incorporated in said wall.

6. A football including a reinforcing wall having a layer of fabric which is provided with warp and woof threads extending in the directions of the major and minor circumferences of the ball, the threads extending in the direction of the minor circumference, and only these threads, being incapable of stretching more than 10% of their lengths without rupture when subjected to a tensile stress of 10 pounds per inch of fabric width, the fabric width being measured in a direction normal to the threads which extend in the direction of said minor circumference.

7. A football including a reinforcing wall having a layer of fabric which is provided with warp and woof threads extending in the directions of the major and minor circumferences of the ball, the threads extending in the direction of the minor circumference, and only these threads, being incapable of stretching more than 5% of their lengths without rupture when subjected to a tensile stress of 10 pounds per inch of fabric width, the fabric width being measured in a direction normal to the threads which extend in the direction of said minor circumference.

8. A football according to claim 6 wherein said fabric layer is composed of a plurality of lenticular pieces of fabric joined together along their edges and arranged with their major and minor axes extending in the directions of the major and minor circumferences, respectively, of the ball.

9. A football as defined in claim 8 wherein the edges of said lenticular pieces of fabric are overlapped.

HERBERT EDWIN TEBBETTS, JR.
ANTONE F. REZNICEK.

References Cited in the file of this patent
UNITED STATES PATENTS

| Number | Name | Date |
|---|---|---|
| 1,926,615 | Drohnn | Sept. 12, 1933 |
| 2,175,128 | Reach | Oct. 3, 1939 |
| 2,219,078 | Reach | Oct. 22, 1940 |
| 2,221,533 | Voit et al. | Nov. 12, 1940 |
| 2,287,171 | Goldsmith | June 23, 1942 |
| 2,302,985 | Voit et al. | Nov. 24, 1942 |
| 2,352,872 | Voit et al. | July 4, 1944 |
| 2,380,370 | Smith | July 10, 1945 |